(12) United States Patent
Carolan et al.

(10) Patent No.: US 10,803,489 B2
(45) Date of Patent: Oct. 13, 2020

(54) SYSTEMS AND METHODS FOR DISPLAYING ADVERTISEMENTS ON MOBILE DEVICES BASED ON AVAILABLE WIRELESS NETWORKS

(71) Applicants: Gerard Carolan, Co. Meath (IE); Triona Mullane, Dublin (IE)

(72) Inventors: Gerard Carolan, Co. Meath (IE); Triona Mullane, Dublin (IE)

(73) Assignee: MADME TECHNOLOGIES LIMITED, Dublin (IE)

( * ) Notice: Subject to any disclaimer, the term of this patent is extended or adjusted under 35 U.S.C. 154(b) by 287 days.

(21) Appl. No.: 15/387,511

(22) Filed: Dec. 21, 2016

(65) Prior Publication Data

US 2018/0174192 A1  Jun. 21, 2018

(51) Int. Cl.
| | |
|---|---|
| G06Q 30/00 | (2012.01) |
| G06Q 30/02 | (2012.01) |
| H04L 29/08 | (2006.01) |
| H04W 84/12 | (2009.01) |
| H04W 48/18 | (2009.01) |
| H04W 8/18 | (2009.01) |

(52) U.S. Cl.
CPC ......... *G06Q 30/0267* (2013.01); *H04L 67/16* (2013.01); *H04L 67/20* (2013.01); *H04L 67/36* (2013.01); *H04W 8/183* (2013.01); *H04W 48/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,084,013 B1 | 7/2015 | Arini et al. | |
| 2005/0059416 A1* | 3/2005 | Ono | H04L 12/14 455/457 |
| 2012/0047011 A1* | 2/2012 | Rippetoe | G06Q 30/02 705/14.45 |

(Continued)

FOREIGN PATENT DOCUMENTS

| | | | | |
|---|---|---|---|---|
| JP | 2011049701 A | * | 3/2011 | ............ H04W 48/16 |
| JP | 2011155458 A | * | 8/2011 | .............. H04M 1/00 |

(Continued)

OTHER PUBLICATIONS

U.S. Department of Defense. Identity Awareness, Protection, and Management Guide. (May 2016). Retrieved online Jun. 3, 2020. https://www.dni.gov/files/NCSC/docurnents/campaign/DoD-IAPM-Guide-Third-Edition-May-2016.pdf (Year: 2016).*

(Continued)

*Primary Examiner* — James A Reagan
(74) *Attorney, Agent, or Firm* — The Marbury Law Group, PLLC

(57) ABSTRACT

Methods, systems, and devices for displaying advertisements on mobile devices based on available wireless networks. In aspect a computerized method comprises determining a list of service set identifiers of available wireless networks, determining that the service set identifier matches a campaign service set identifier stored on the mobile device, determining a media object to display based on the service set identifier, downloading the media object on the mobile device, and displaying the media object on the mobile device.

7 Claims, 9 Drawing Sheets

(56) References Cited

U.S. PATENT DOCUMENTS

| | | | |
|---|---|---|---|
| 2013/0079036 A1 | 3/2013 | Sharet | |
| 2013/0151343 A1 | 6/2013 | Phan | |
| 2013/0173358 A1* | 7/2013 | Pinkus | G06Q 30/0265 705/14.1 |
| 2014/0006161 A1* | 1/2014 | Jabara | G06Q 30/0261 705/14.57 |
| 2015/0012332 A1* | 1/2015 | Papachristos | G06Q 10/06311 705/7.29 |
| 2015/0051975 A1* | 2/2015 | Kadous | G06Q 30/0261 705/14.58 |
| 2015/0120442 A1 | 4/2015 | Ganesh et al. | |
| 2018/0077572 A1* | 3/2018 | Trappitt | H04L 67/20 |
| 2018/0131975 A1* | 5/2018 | Badawiyeh | H04N 21/23424 |

FOREIGN PATENT DOCUMENTS

| | | | |
|---|---|---|---|
| JP | 2016181922 A * | 10/2016 | ............ H04W 48/18 |
| WO | 2016/149069 A1 | 9/2016 | |
| WO | 2016149069 A1 | 9/2016 | |
| WO | 2016/162859 A1 | 10/2016 | |
| WO | 2016162859 A1 | 10/2016 | |

OTHER PUBLICATIONS

International Search Report and Written Opinion for Application No. PCT/US2016/068476, dated Mar. 20, 2017, 7 pages.
European Search Report for European Application No. 16924693.1 dated Jul. 30, 2020, 8 pages.

* cited by examiner

SYSTEMS AND METHODS FOR DISPLAYING ADVERTISEMENTS ON MOBILE DEVICES BASED ON AVAILABLE WIRELESS NETWORKS

BACKGROUND

The present disclosure generally relates to mobile telephony systems and software therefor, and in particular a system for displaying directed advertisements in a mobile telephone network.

Advertising on mobile devices, such as smartphones, is increasingly used by advertisers to reach a wide audience of consumers. One advantage of mobile advertising over traditional advertising is that the mobile advertisements on smartphones may be narrowly tailored to the users of the smartphones. For example, mobile advertising networks such as AdMob for Android platform or iAds for iOS platform may use a targeting algorithm to select mobile ads deemed to be of interest to smartphone users based on information known about the users. Leveraging user information for targeted mobile advertising enables the advertisers to reach consumers as efficiently as possible. Users benefit by being able to view ads that are of their interest. Developers of mobile applications commonly use mobile ads to monetize the apps.

US Patent Publication No. 20150120442 is directed toward targeted mobile advertising directed at users of multiple subscriber identity modules (SIM) in a telephone. The method disclosed directs advertisements to the user's mobile phone based on whether the SIM is used for work or personal communication. US Patent Publication No. US 20130151343 to Phan introduces a method of monitoring physical activity of a telephone user via sensors on the telephone, to target advertisements.

However, currently no mechanism/technology exists where a company can use the availability of their own wireless network to display relevant content to the user.

SUMMARY OF THE INVENTION

In one aspect, the present application discloses methods, systems, and devices for displaying media on a mobile device. In one embodiment the method comprises determining by a mobile computing device a list of service set identifiers of available wireless networks, determining by the mobile computing device that a service set identifier from the list of service set identifiers matches a campaign service set identifier stored on the mobile computing device, determining a media object to display based on the service set identifier, downloading the media object on the mobile computing device, and displaying the media object on the mobile computing device. The media object may be an advertisement. In an embodiment, the method further comprises sending tracking data comprising details about the displayed media object to a server computing device. The media object may further be determined based on an identity associated with the mobile device. In one embodiment, the media object is downloaded before determining that the service set identifier matches the campaign service set identifier stored on the mobile computing device. In another embodiment, the media object is downloaded after determining that the service set identifier matches the campaign service set identifier stored on the mobile computing device. In an embodiment, the mobile computing device receives the list of campaign service set identifiers from a server computing device and stores it on the mobile computing device before the list of service set identifiers of available wireless networks is determined.

In another embodiment, the method comprises sending a notification from a server computing device to a mobile computing device, wherein the notification comprises a campaign id and a list of campaign service set identifiers, receiving by the server computing device a call to download a media object from the mobile computing device, determining that the mobile computing device is eligible to receive the media object, and delivering the media object to the mobile computing device. The media object may be an advertisement. In an embodiment, the method further comprises receiving tracking data comprising details about display of the media object from the mobile computing device.

In an embodiment, the method comprises determining by a mobile computing device a list of service set identifiers of available wireless networks, determining by a mobile computing device a list of service set identifiers of available wireless networks, sending by the mobile computing device the list of service set identifiers to a server computing device, determining by the server computing device that a service set identifier from the list of service set identifiers matches a campaign service set identifier stored on the server computing device, determining a media object to display based on the service set identifier, downloading the media object on the mobile computing device, and displaying the media object on the mobile computing device. The media object may be an advertisement. In an embodiment, the method further comprises sending tracking data comprising details about the displayed media object to a server computing device. The media object may further be determined based on an identity associated with the mobile device. In one embodiment, the media object is downloaded before determining that the service set identifier matches the campaign service set identifier stored on the mobile computing device. In another embodiment, the media object is downloaded after determining that the service set identifier matches the campaign service set identifier stored on the mobile computing device.

This, and further aspects of the present embodiments are set forth herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Figure 1:
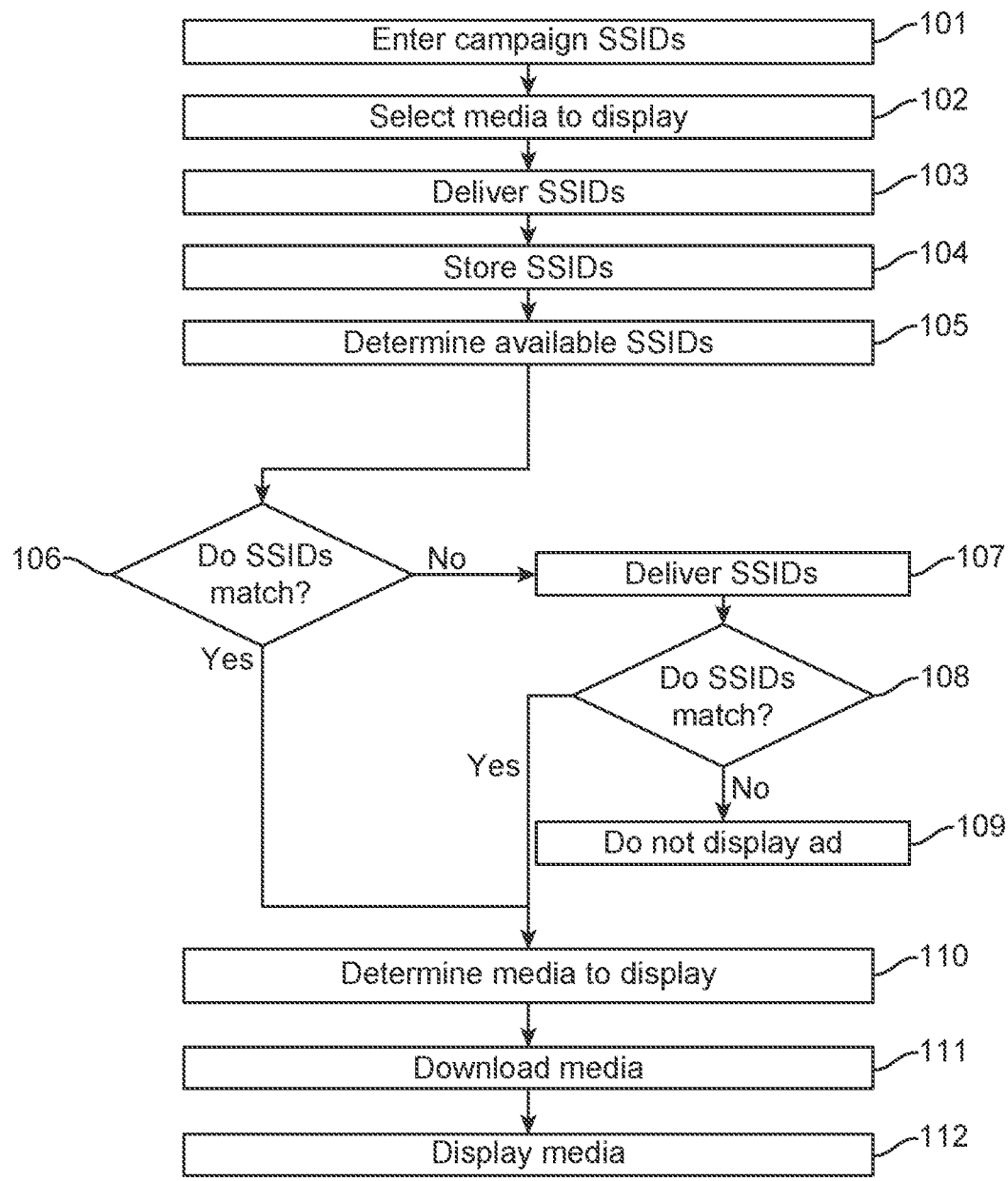
FIG. 1 shows an exemplary method for displaying advertisements on mobile devices based on available WiFi networks.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration." Any implementation described herein as "exemplary" is not necessarily to be construed as advantageous over other implementations. The terms "mobile device", "cellular device", and "wireless device" may be used interchangeably and refer to any one of the various cellular telephones, smart phones, multimedia enabled cellular telephones, tablets, personal digital assistants, laptops, and similar electronic devices capable of sending and receiving wireless communication signals. In an embodiment, the wireless device is a cellular handheld device (e.g., a mobile device), which can communicate via a wireless communication network. The terms "app", "application", "program", and "software" may be used interchangeably and may include standalone applications, SDKs, and modules of applications or operating systems.

The present disclosure describes methods, systems, and devices for displaying advertisements on mobile telephone devices based on available WiFi networks. While the embodiments described herein refer to WiFi networks and SSIDs, other wireless or wired networks, technologies, and identifiers may be used. In an embodiment, the system comprises software and decision engines that are configured to store one or more advertisement campaigns, a set of rules for triggering an advertisement to user, and to send an advertisement to a user via a messaging service. The system may interact with the mobile user via a mobile application installed on the user's device. When a wireless network is detected, the system sends an advertisement to the user's mobile device based on trigger conditions. In an embodiment, the advertisement is delivered to the user once the available wireless network is detected. In another embodiment, the advertisement may be delivered to the user once connected to the wireless network. The system enables an advertiser to deliver targeted advertisements to a mobile user, which is mutually beneficial.

Figure 2:
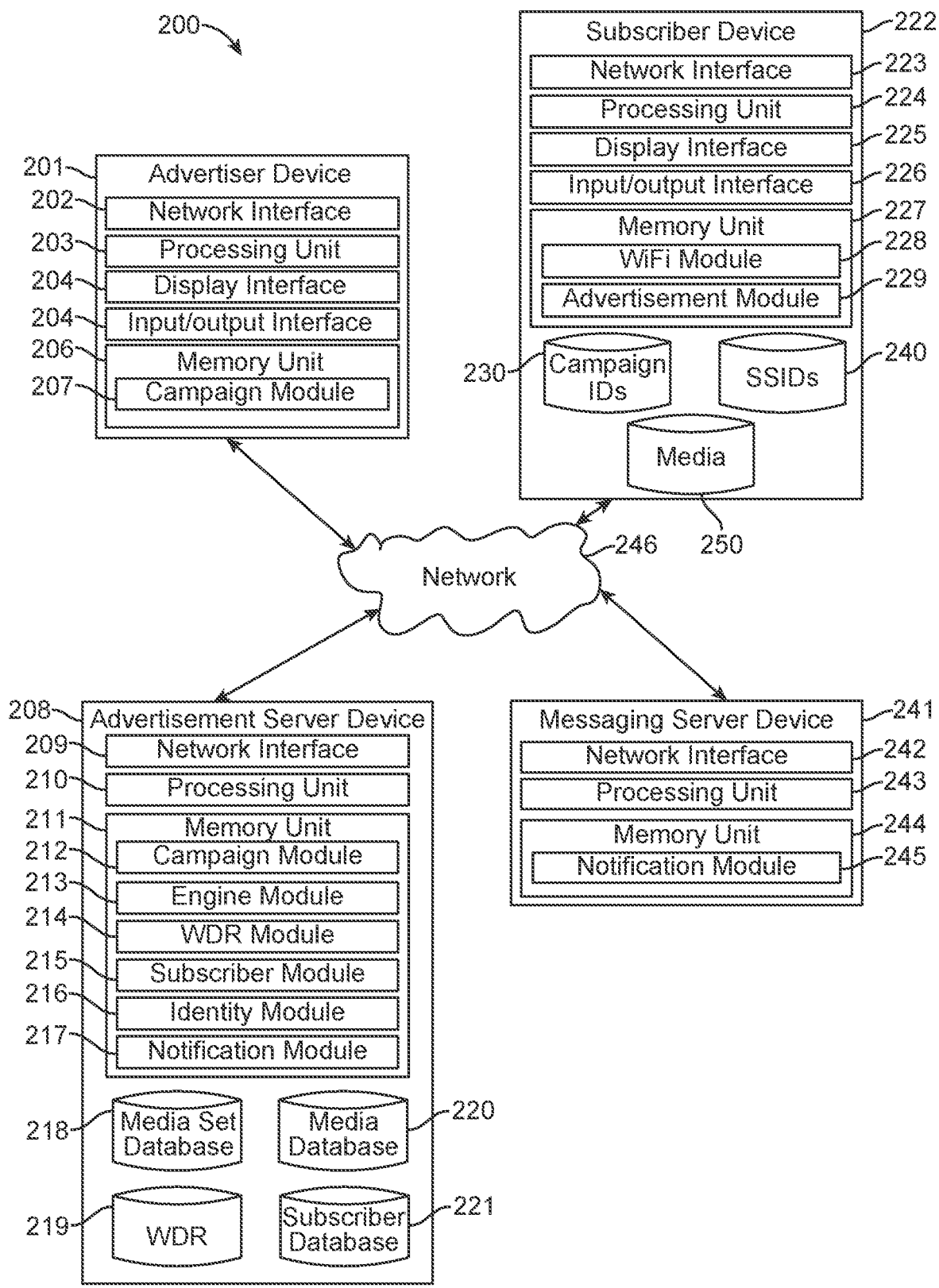
FIG. 2 shows an exemplary system architecture.

FIG. 1 shows a method for displaying advertisements on mobile telephone devices based on available WiFi networks. A corresponding exemplary system architecture is shown in FIG. 2. At step 101 one or more Service Set Identifiers (SSIDs) associated with an advertisement campaign are entered on an advertiser computing device 201. The SSIDs may then be delivered to an advertisement server computing device 208. At step 102 one or more media elements are selected on the advertiser computing device 201 to be displayed on a subscriber mobile device 222 when one of the SSIDs is available to the subscriber mobile device 222. The media elements may then be delivered to an advertisement server computing device 208.

At step 103, one or more of the SSIDs are delivered from the advertisement server computing device 208 to one or more subscriber mobile devices 222 using a message and/or a notification. In an embodiment, a separate messaging server device 241 is used to deliver the notification to the subscriber mobile device 222. At step 104 the SSIDs are stored on the subscriber mobile device 222.

At step 105 the subscriber mobile device 222 determines the available SSIDs. At step 106 the subscriber mobile device 222 determines if any of the available SSIDs match one of the SSIDs stored on the mobile telephone device 222. If a SSID matches, the system determines the media to display at step 110. In an embodiment, the media is an advertisement.

At step 111 the subscriber mobile device 222 downloads the media. In an embodiment, media may be streamed from the server and displayed on the mobile telephone device 222 in real-time based on network conditions. Alternatively, the media may be downloaded in advance and cached on the subscriber mobile device 222. The media is then displayed on the subscriber mobile device 222 at step 112.

If at step 106, the subscriber mobile device 222 determines that the SSID does not match an SSID stored on the mobile telephone device 222, then the subscriber mobile device 222 delivers the SSID to the advertisement server device 208 at step 107. At step 108 the advertisement server device 208 determines if the SSID matches one of the SSIDs associated with an advertisement campaign. If the SSID matches, the system determines the media to display at step 110. At step 111 the subscriber mobile device 222 downloads the media. The media is then displayed on the subscriber mobile device 222 at step 112.

In an embodiment, if at step 109, the advertisement server device 208 determines that the SSID does not match one of the SSIDs associated with an advertisement campaign, then the media is not displayed. In an alternative embodiment, the system determines media to display based on the subscriber mobile device 222.

FIG. 2 illustrates an exemplary system architecture according to one embodiment. The system 200 may comprise one or more advertiser computing devices 201, one or more subscriber mobile devices 222, one or more advertisement server computing devices 208, and one or more messaging server computing devices 241. The computing devices 201, 222, 208, 241 are configured to communicate over the network 246.

Computing devices 201, 222, 208, 241 may comprise various components including but not limited to one or more processing units 203, 210, 224, 243, memory units 206, 211, 227, 244, video or display interfaces 204, 225, network interfaces 202, 209, 223, 242, input/output interfaces, video recording units 204, 217, and buses that connect the various units and interfaces 205, 226. The network interfaces 202, 209, 223, 242 enable the computing devices 201, 222, 208, 241 to connect to the network 246 The memory units 206, 211, 227, 244 may comprise random access memory (RAM), read only memory (ROM), electronic erasable programmable read-only memory (EEPROM), and basic input/output system (BIOS). The memory units 206, 211, 227, 244 may further comprise other storage units such as non-volatile storage including magnetic disk drives, optical drives, flash memory and the like.

While FIG. 2 depicts one advertiser computing device 201, one subscriber mobile device 222, one advertisement server computing device 208, one messaging server computing device 241, and one network 246, this is meant as merely exemplary. Alternatively, any number of computing devices 201, 222, 208, 241, or networks 246 may be present. Some or all of the components of the computing devices 201, 222, 208, 241 may be combined into a single component. Likewise, some or all of the components of the computing devices 201, 222, 208, 241 may be separated into distinct components connected through the network 246.

The modules of computing devices 201, 222, 208, 241 may be implemented as software code to be executed by a processing unit 203, 210, 224, 243 using any suitable computer language. The software code may be stored as a series of instructions or commands in a memory unit 206, 211, 227, 244. While specific modules are shown as part of specific computing devices 201, 222, 208, 241, modules may additionally or alternatively be integrated into any of the other computing devices 201, 222, 208, 241. Any of the described modules may be standalone applications, part of the device operating system, or incorporated into other modules or applications.

Advertiser computing device 201 may comprise a campaign module 207. Subscriber mobile devices 222 may comprise a WiFi module 228 and an advertisement module 229. Subscriber mobile devices 222 may comprise locally stored campaign IDs 230, SSIDs 240, and media 250.

Advertisement server computing device 208 may comprise a campaign module 212, an engine module 213, a WiFi Domain Registry (WDR) module 214, a subscriber module 215, an identity module 216, and a notification module 217. Advertisement server computing device 208 may comprise a media set database 218, a media database 220, an WDR repository 219, and a subscriber database 221.

System 200 may incorporate a messaging server computing device 241 configured to deliver messages to subscriber mobile devices 222. Messaging server computing device 241 may comprise a notification module 245. In an embodiment, the messaging server device 241 is a separate device from the advertisement server device 208. In an alternative embodiment, the advertisement server device 208 and the messaging server device 241 may be combined into a single device.

Campaign modules 207, 212 are configured to create media campaigns. WiFi module 228 is configured to communicate with other wireless devices over a wireless network. Advertisement module 229 is configured to receive notifications and/or messages containing campaign IDs and campaign SSIDs, store containing campaign IDs and campaign SSIDs, determine if a called number is associated with a campaign, determine when to display an advertisement, determine which advertisement to display, retrieve advertisement media, and display the advertisement. In an embodiment, advertisement module 229 may incorporated into WiFi module 228 or any other application on the subscriber mobile device 222.

Engine module 213 is configured to create and store the campaign metadata and expose an API to the subscriber mobile devices 222 to request to download campaigns to the device. WiFi Domain Registry (WDR) module 214 is configured to store the SSIDs used to trigger the display of an ad in the WDR 219. WDR 219 may be used as a repository for any campaigns that use SSID triggers. WDR module 214 exposes an API to other components to allow them add/edit/lookup/delete SSIDs on the platform. If a new campaign is created with a SSID trigger then the engine module 213 will use the WDR API to store the SSID(s) associated with this campaign in the WDR 219.

Subscriber module 215 provides a representational state transfer (REST) API for create, read, update and delete (CRUD) operations against the subscriber database 221. Identity module 216 provides an API for authentication and authorization functions. Identity module 216 also provides API's to perform CRUD operations on subscribers. Notification modules 217, 245 are configured to send notifications or messages to subscriber mobile devices 222.

Figure 3:
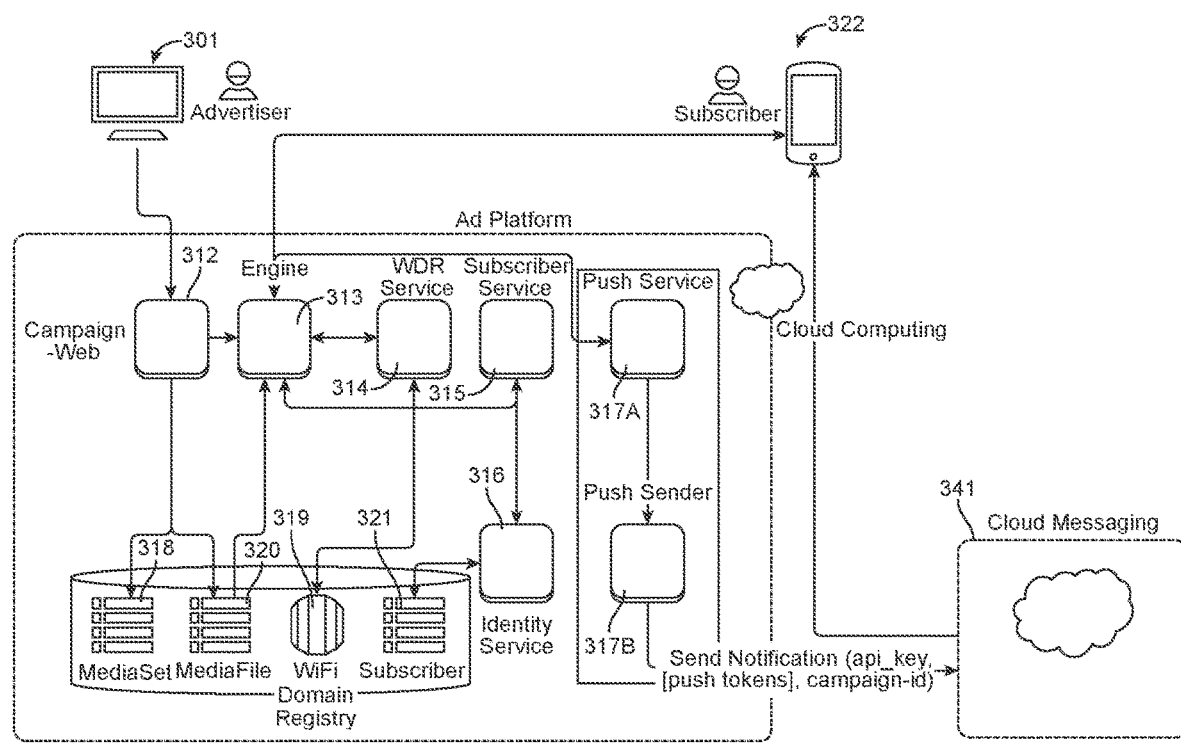
FIG. 3 shows an exemplary embodiment of a system for delivering a targeted advertisement to a mobile user based on available WiFi networks.

FIG. 3 shows an exemplary embodiment of a system for delivering a targeted advertisement to a mobile user based on available wireless networks. The system comprises a campaign web portal 312, an engine service 313, a WiFi Domain Registry (WDR) service 314, a subscriber service 315, a push service 317A and a push sender 317B.

The campaign web portal 312 is used by advertisers to create the available wireless network campaigns via a web based user interface. The campaign web portal 312 may call a REST API to create new campaigns.

The engine component 313 is the service that creates and stores the campaign metadata and exposes an API to the clients to request to download campaigns to the device 322. The ad metadata is stored in several database tables. The ad media set 318 is stored on a filesystem. The engine 313 is configured to notify any registered devices 322 when a new available wireless network campaign is created on the portal using a cloud messaging (CM) 341 notification. The WDR service 314 is the component used to store the WiFi SSID regular expression (Regexp) used to trigger the display of an ad. It is used as a repository for any campaigns that use available wireless network triggers. It exposes an API to other components to allow them to add/edit/lookup/delete available wireless network trigger data on the platform. If a new campaign is created with an available wireless network trigger then the engine service 313 will use the WDR API to store the WiFi SSID(s) associated with this campaign in the WDR repository 319.

The Push service 317A is used to send platform-initiated messages to clients 322 using the cloud messaging framework 341. It will send batch notifications to the CM service when other platform services need to send notifications to the devices. The system further comprises an identity service 316 that provides an API to request OAuth2 tokens for the ad service. Clients 322 acquire a valid OAuth2 access token from the token endpoint before making any calls to the private endpoints. The access token is sent to the server using a HTTP Authorization bearer token header. Every client 322 is registered with the identity service 316. It also provides APIs to perform CRUD operations on subscribers.

The Subscriber service 315 provides a REST API for CRUD operations against the subscriber database table 321. With this API the other services can lookup details about a subscriber who is provisioned on the platform. A subscriber's CM push token can be retrieved from the service in order to send notifications via CM to their mobile device. Subscriber service 315 uses an Identity service 316 client to call the identity service API to request information on subscribers. The client 322 in various embodiments could be a mobile application that receives the CM notification message. The client 322 is configured in various embodiments to display an ad to a user based on one of various triggers configured on the campaign portal 312 when a campaign is configured. A subscriber is a mobile device 322 user who has the ad app or ad sdk installed on their device 322 and who has registered with the ad back end platform.

Figure 4:
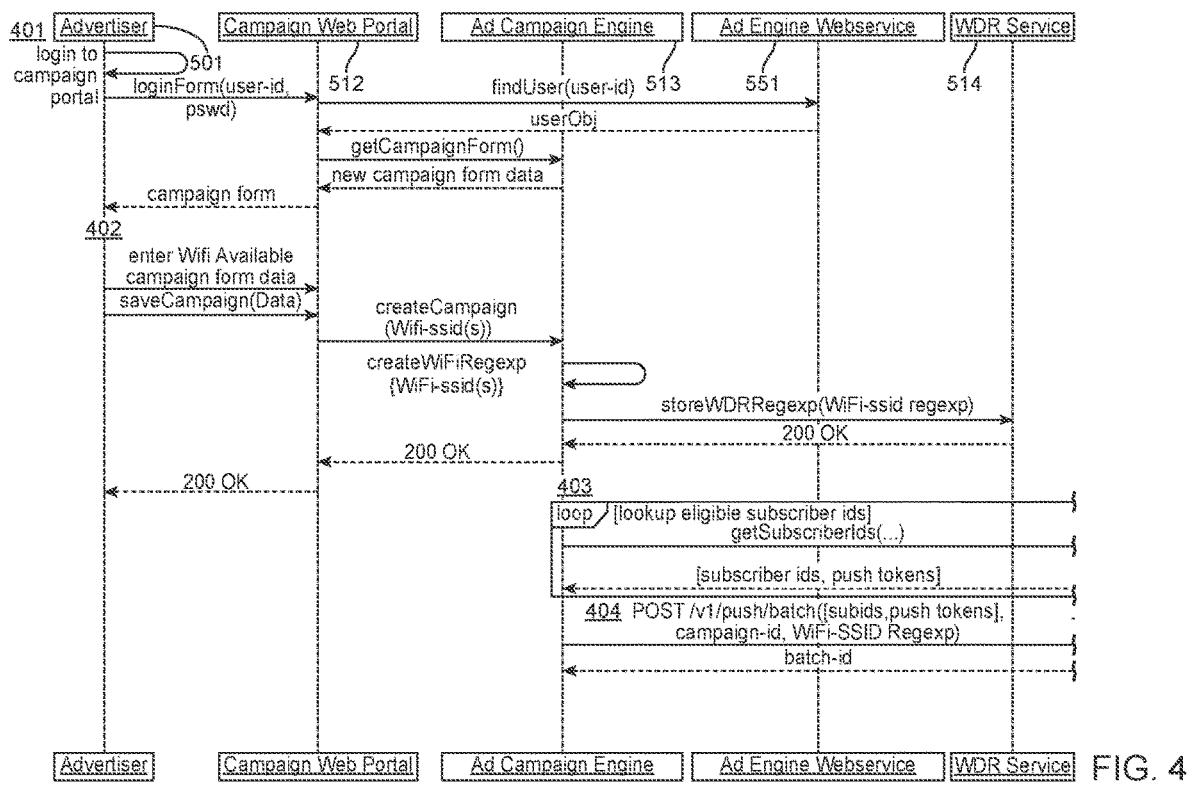
FIG. 4 shows an embodiment for a method of creating an advertisement campaign.
Figure 4:
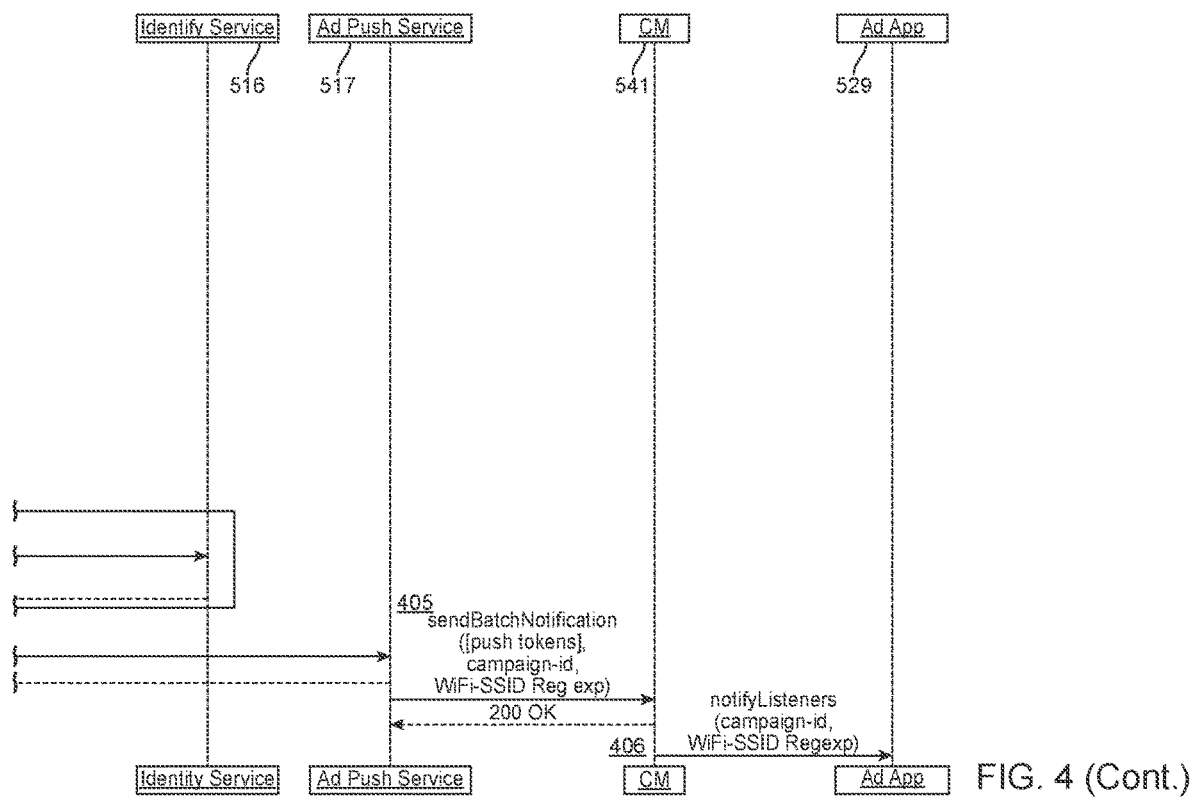

An embodiment for a method of creating an advertisement campaign is disclosed in FIG. 4. At step 401 the advertiser 501 logs into the ad campaign portal 512 using login credentials provided to them. The advertiser 401 selects to create a new ad campaign. At step 402 the advertiser 501 selects the ad trigger type to be an available wireless network trigger as part of the ad creation. They then enter the SSID(s) to be used to trigger the campaign when the mobile device is within range. They select the media to be displayed on the mobile device when the available wireless network campaign is triggered. The Advertiser 501 then saves their new campaign and the engine service 513 takes the form data and stores this information in the database.

When the campaign is approved it will become active and is then available for clients to download. At step 403 the engine service 513 will request the subscriber IDs (subscriber-id, push token) by calling the identity service 516. The identity service 516 will get the IDs for each subscriber that is eligible to receive this new campaign notification. The identity service 516 returns the list of IDs to the Engine service 513 so it can create a batch push notification.

At step 404 the engine service 513 then calls the push service 517, by posting a batch request with the subscriber IDs, campaign ID, notification type, and the available wireless network regexp associated with the campaign. The Push service 517 then creates a batch notification request to send to the CM service 541.

At step 405 the Push service 517 then sends the batch notifications to the CM service 541. In an embodiment, the batch size is approximately 1000. Multiple push notifications may need to be sent to the CM service 541 to notify all active clients of the new available wireless network campaign.

At step 406 the CM service 541 will forward the push notification to each device that has a push token. The ad app or ad sdk 529 on the device will get the push notification, it will then store the campaign-id in its local database and also store the available wireless network regexp in the ad app/sdk's 529 WiFi name registry. When the ad app/sdk 529 detects that an available Wifi hotspot SSID is a match for an entry in its Wifi name registry, it will call the Ad Engine service to request to download the Ad campaign from the server. The download happens over a data connection, this flow is outlined in FIG. 5. In an embodiment, the ad app/sdk 529 can also pull the campaign data from the server in real-time using the campaign-id.

Figure 5:
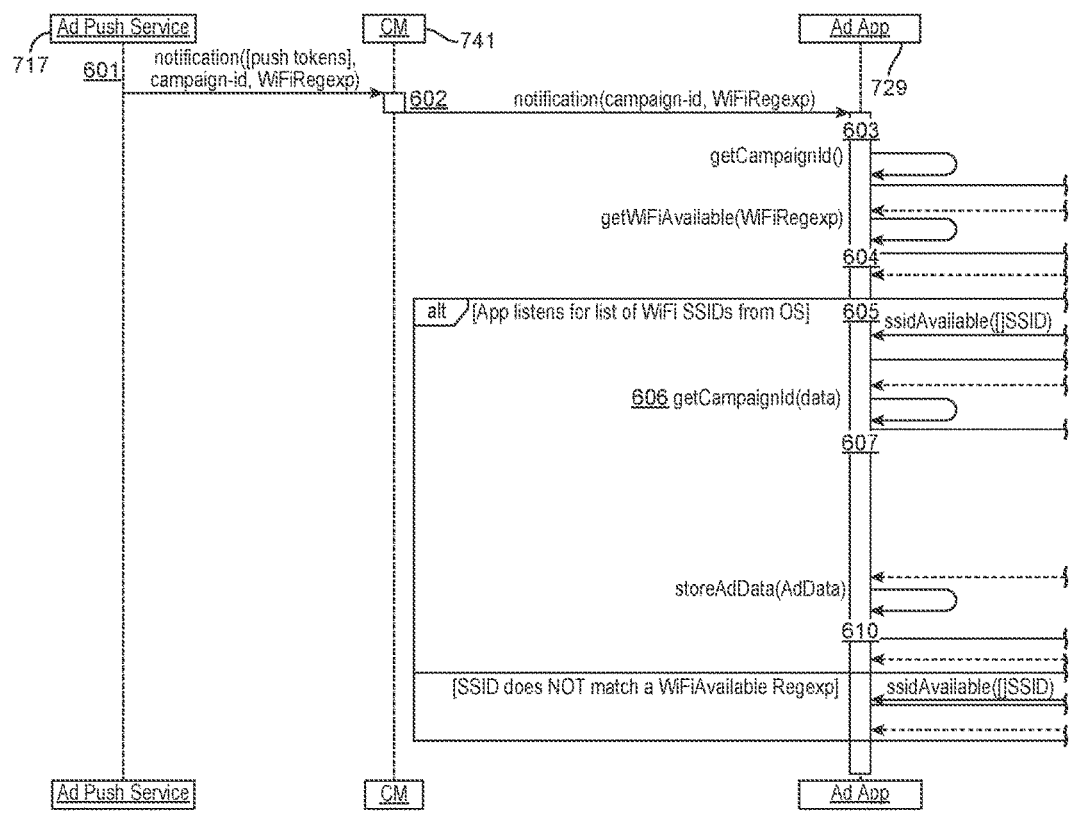
FIG. 5 shows an embodiment for a method of retrieving an available wireless network campaign from a server via a cloud messaging notification.
Figure 5:
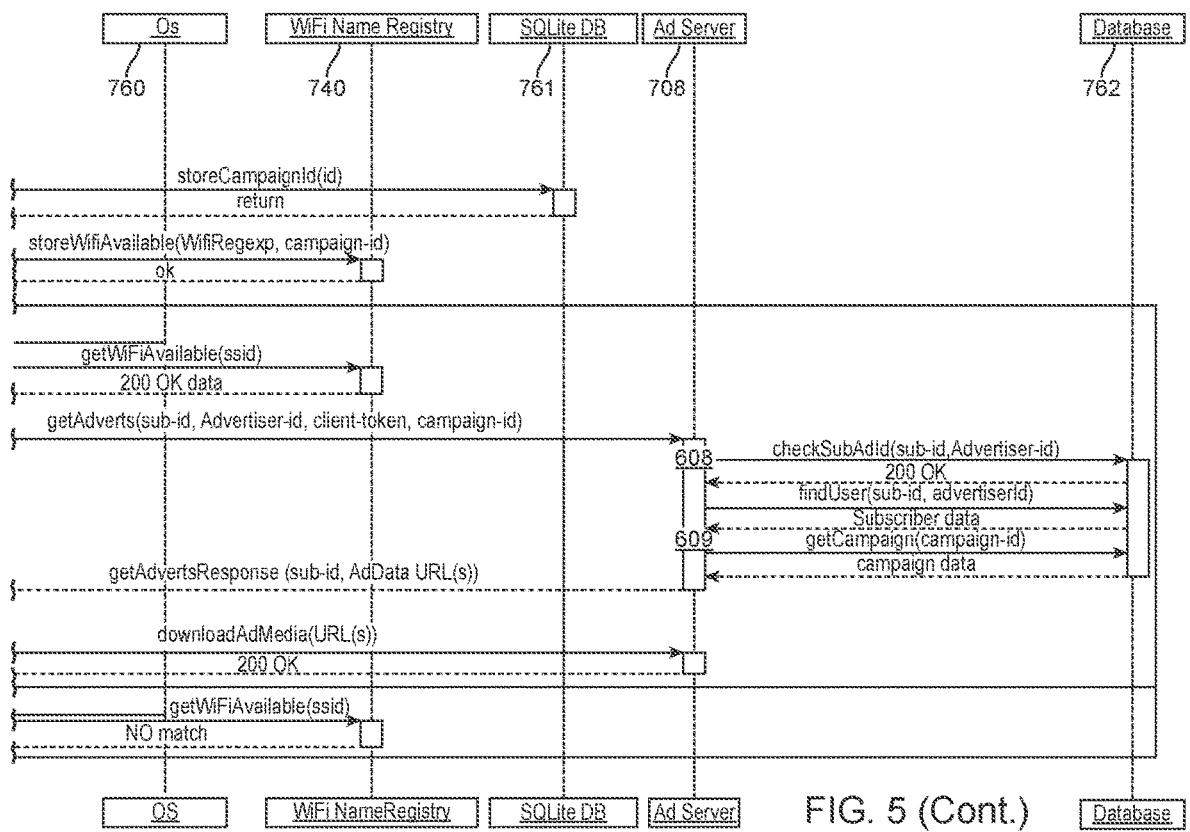

An embodiment for a method of retrieving an available wireless network campaign from a server via a cloud messaging notification is illustrated in FIG. 5. At step 601 the push service 717 sends a batch notification message to the CM service 741 with the campaign-id, WiFi SSID regexp, and the subscriber push tokens. At step 602 the CM service 741 sends the notification to all clients that a push token provided by the push service 717.

At step 603 the app/SDK 729 receives the notification from the CM service 741 and retrieves the campaign-id and WiFi SSID regexp from the push notification. At step 604 the app/SDK 729 then stores the WiFi SSID regexp and campaign-id in the WiFi name registry 740.

At step 605 the app/SDK 729 scans for the available Wifi SSIDs and checks if the SSIDs match any of the WiFi SSID regexp stored in the WiFi name registry. At step 606 the client will then lookup the campaign-id associated with the WiFi SSID regexp from the returned data from the WiFi name registry.

At step 607 if the client finds a match, the app/SDK 729 calls the Ad server 708 to download the Ad campaign using the campaign-id from the push notification. At step 608 the ad server 708 then checks that the device's Advertiser-id hasn't changed from the last received getAdverts( ) API call to the server 708 from this device. The Engine service looks up the subscriber and then checks that they are eligible to receive the Ad campaign.

At step 609 the Engine service sends the Ad data back to the device. This may contain a URL link to the campaign media. At step 610 the app/SDK 729 then downloads the Ad media files using the returned URL from the Ad metadata and stores the data into its local cache. In an embodiment, ads may be displayed in real-time based on network conditions, for example, if the client is connected to a 4G/LTE cellular network or a WiFi network.

Figure 6:
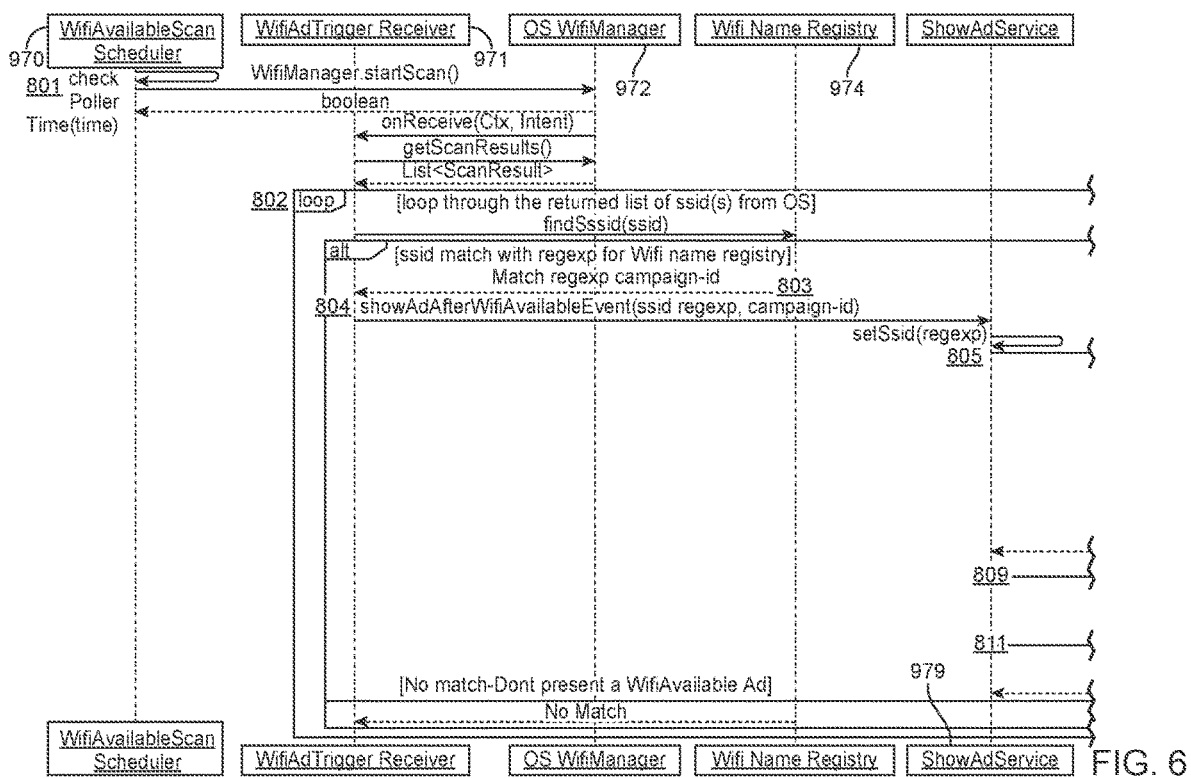
FIG. 6 shows an embodiment for a method to display an advertisement based on available WiFi networks.
Figure 6:
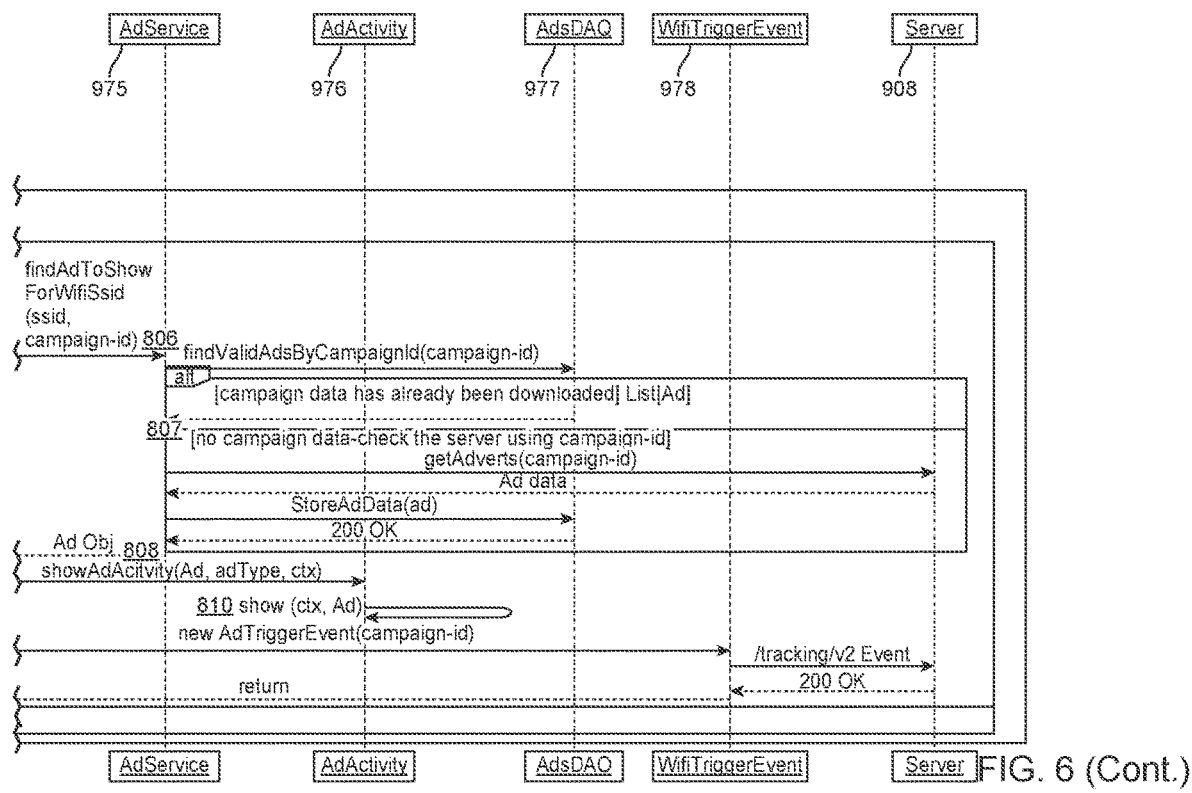

An embodiment for a method to display an advertisement based on available WiFi networks is illustrated in FIG. 6. In this embodiment, the client has populated its WiFi name registry with the SSID regexp associated with the campaign and has stored the campaign data in its local cache. The Subscriber has the Ad app/sdk installed and it is active. The Ad app/SDK has access to the available SSIDs list from the operating system.

At step 801 the Ad app/SDK will have a scheduler 970 task that will periodically poll the OS WiFi Manager 972 by requesting a WiFi scan of the available SSIDs. The time between scans may be configurable. The WiFi Manager 972 will respond back to the scheduler 970 that it has begun the scan. The Ad app/SDK has a Wifi Trigger Receiver 971 that gets notified that there is a list from the Wifi Manager 972. It then requests the SSID list using the public API method getScanResults( ).

At step 802 the Ad app/SDK will iterate through the list of returned SSIDs and check if any of the SSID values are stored as regular expressions in the Wifi name registry 974 by using its API lookup methods.

At step 803 if a match is detected then the SSID regexp and the associated campaign-id is returned to the Wifi-AdTrigger 971 class. At step 804 The WifiAdTrigger 971 class will pass the campaign-id and ssid regexp to the ShowAdService 979.

At step 805 The ShowAdService 979 will store the SSID value and then request call the AdService 975 class to retrieve the campaign Ad data. At step 806 The AdService 975 will lookup the campaign data using the AdsDAQ class that wraps the SQLite DB. It uses the findValidAdsByCampaignId( ) method to retrieve the Ad Object that matches the campaign-id.

At step 807 if there's no campaign data stored for this campaign-id on the client, then the apk/sdk will lookup the campaign data against the Server Engine API to download the ad data in real-time. At step 808 the Ad object is returned to the ShowAdService 979 class as an Ad object.

At step 809 the Ad object is send to the AdActivity 976 class to be used to display the ad media using the showAdActivity( ) method. At step 810 the AdActivity 976 will use this Ad object to display the Ad media on the subscriber device. Details about the Ad media are stored in the Ad object. At step 811 after the Ad is displayed, the ShowAdService 979 will send a tracking event to the Tracking API on the server 908 with details about the Ad displayed. This tracking data may be used to generate Ad reports on the server 908 side which contain details about the campaigns such as impressions, CTR, view times, etc.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus or system for performing the operations herein. This apparatus or system may be specially constructed for the required purposes, and/or it may comprise a general-purpose computing device selectively activated or reconfigured by a computer program stored in a computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The various components depicted in FIGS. 2 and 3 may comprise computing devices or reside on computing devices such as servers, desktop computers, laptop computers, tablet computers, personal digital assistants (PDA), smartphones, mobile phones, smart devices, appliances, sensors, or the like. Computing devices may comprise processors, memories, network interfaces, peripheral interfaces, and the like. Some or all of the components may comprise or reside on separate computing devices. Some or all of the components depicted may comprise or reside on the same computing device.

The various components in FIGS. 2 and 3 may be configured to communicate directly or indirectly with a wireless network such as through a base station, a router, switch, or other computing devices. In an embodiment, the components may be configured to utilize various communication protocols such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), and Worldwide Interoperability for Microwave Access (WiMAX).

The components may be further configured to utilize user datagram protocol (UDP), transport control protocol (TCP), Wi-Fi, satellite links and various other communication protocols, technologies, or methods. Additionally, the components may be configured to connect to an electronic network without communicating through a wireless network. The components may be configured to utilize analog telephone lines (dial-up connection), digital lines (T1, T2, T3, T4, or the like), Digital Subscriber lines (DSL), Ethernet, or the like. It is further contemplated that the components may be connected directly to a computing device through a USB port, Bluetooth, infrared (IR), Firewire port, thunderbolt port, ad-hoc wireless connection, or the like. Components may be configured to send, receive, and/or manage messages such as email, SMS, IM, MMS, or the like.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A method for displaying media on a mobile computing device comprising:
    receiving, by the mobile computing device, a cloud messaging notification including a campaign ID and a list of associated campaign service set identifiers;
    updating a list of campaign service set identifiers stored on the mobile computing device based on the campaign ID and the list of associated campaign service set identifiers included in the received cloud messaging notification;
    determining, by the mobile computing device, whether a service set identifier broadcast by an available wireless network matches a campaign service set identifier included in the updated list of campaign service set identifiers stored on the mobile computing device;
    using, by the mobile computing device, the matching service set identifier to determine a media object to display on the mobile computing device in response to the mobile computing device determining that the service set identifier of the available wireless network matches the campaign service set identifier included in the updated list of campaign service set identifiers stored on the mobile computing device;
    downloading the media object on the mobile computing device; and
    displaying the downloaded media object on the mobile computing device.

2. The method of claim 1, wherein using the matching service set identifier to determine the media object to display on the mobile computing device in response to the mobile computing device determining that the service set identifier of the available wireless network matches the campaign service set identifier included in the updated list of campaign service set identifiers stored on the mobile computing device comprises selecting an advertisement to display on the mobile computing device based on the matching service set identifier in response to the mobile computing device determining that the service set identifier of the available wireless network matches the campaign service set identifier included in the updated list of campaign service set identifiers stored on the mobile computing device.

3. The method of claim 1, further comprising sending tracking data comprising details about the displayed media object to the server computing device.

4. The method of claim 1, wherein using the matching service set identifier to determine the media object to display on the mobile computing device in response to the mobile computing device determining that the service set identifier of the available wireless network matches the campaign service set identifier included in the updated list of campaign service set identifiers stored on the mobile computing device further comprises determining the media object to display on the mobile computing device based on an identity associated with the mobile computing device.

5. The method of claim 1, further comprising:
    receiving by the mobile computing device the list of campaign service set identifiers from a server computing device; and
    storing the received list of campaign service set identifiers on the mobile computing device.

6. The method of claim 1, wherein downloading the media object on the mobile computing device comprises downloading the media object prior on the mobile computing device to the mobile computing device determining whether the service set identifier broadcast by the available wireless network matches the campaign service set identifier included in the updated list of campaign service set identifiers stored on the mobile computing device.

7. The method of claim 1, wherein downloading the media object on the mobile computing device comprises downloading the media object on the mobile computing device in response to the mobile computing device using the matching service set identifier to determine the media object to display on the mobile computing device.

* * * * *